(12) United States Patent
Osakabe et al.

(10) Patent No.: US 6,980,495 B2
(45) Date of Patent: Dec. 27, 2005

(54) OPTICAL RECORDING APPARATUS WITH INTERLEAVING BLANK ROUNDS INTO SPIRAL TRACK

(75) Inventors: Katsuichi Osakabe, Hamamatsu (JP); Akira Usui, Hamamatsu (JP); Shinji Aoshima, Hamamatsu (JP); Hiromitsu Shibata, Hamamatsu (JP); Masaki Dojun, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 11 days.

(21) Appl. No.: 10/600,691

(22) Filed: Jun. 20, 2003

(65) Prior Publication Data

US 2004/0008593 A1 Jan. 15, 2004

(30) Foreign Application Priority Data

Jun. 21, 2002 (JP) ............................. 2002-182141

(51) Int. Cl.⁷ .................... G11B 7/0045; G11B 7/007
(52) U.S. Cl. ................. 369/44.26; 369/111; 369/53.3; 369/44.38
(58) Field of Search ............... 369/111, 53.3, 369/44.26, 44.38, 53.29

(56) References Cited

U.S. PATENT DOCUMENTS

| | | | | |
|---|---|---|---|---|
| 5,128,914 A | * | 7/1992 | Kurata et al. | 369/44.37 |
| 5,161,134 A | * | 11/1992 | Lee | 369/13.32 |
| 5,500,840 A | * | 3/1996 | Ogasawara | 369/30.1 |
| 5,734,633 A | * | 3/1998 | Aoki et al. | 369/44.26 |
| 5,774,439 A | * | 6/1998 | Aoki et al. | 369/53.29 |
| 6,246,651 B1 | * | 6/2001 | Fukinuki et al. | 369/53.3 |
| 6,295,261 B1 | * | 9/2001 | Kim | 369/53.3 |
| 6,493,297 B1 | * | 12/2002 | Isono et al. | 369/44.37 |

* cited by examiner

Primary Examiner—Brian E. Miller
Assistant Examiner—Michael V. Battaglia
(74) Attorney, Agent, or Firm—Morrison & Foerster LLP (57) ABSTRACT

In an optical recording apparatus having an optical pickup, a rotating section is provided for rotating an optical disk which is formed thereon with a guide groove to define a spiral track having a plurality of rounds. The optical pickup has a light source for generating an optical beam and a diffractive grating for diffracting the optical beam to form a main beam and a pair of sub beams opposite with each other relative to the main beam. The optical pickup is operable for irradiating the main beam to the spiral track with accompanying the pair of the sub beams along apposite sides of the spiral track. A servo section operates the optical pickup to enable the main beam to trace the spiral track based on a tracking error signal derived from return lights of the sub beams reflected back from the optical disk. A recording section modulates the main beam for recording of information onto the spiral track while the optical dick is rotated. A control section controls recording of information each cycle the optical disk is rotated such that the recording of information is enabled to fill one round of the spiral track and disabled to blank another round of the spiral track so as to alternate the filled rounds and the blanked rounds.

8 Claims, 6 Drawing Sheets

ONE TRACK JUMP RECORDING

ONE TRACK JUMP RECORDING

FIG.5

MULTI TRACK JUMP RECORDING

FIG. 6

INTERPOSING RECORDING AFTER
ONE TRACK JUMP RECORDING

CD-ROM

OPTICAL RECORDING APPARATUS WITH INTERLEAVING BLANK ROUNDS INTO SPIRAL TRACK

BACKGROUND OF THE INVENTION

1. Technical Field of the Invention

The present invention relates to an optical disk recording apparatus which irradiates a guide groove preformed in an optical disk with an optical beam mainly responsible to carry out information recording along the guide groove, and particularly to a compact disk recording apparatus.

2. Prior Art

When recording/playback is carried out in an optical disk recording apparatus, particularly in a CD-R recording apparatus, an optical beam is controlled to trace a track formed on the optical disk. Various control methods are available, and there is a method called a 3-beam method which uses a zero-order light as a main beam and positive and negative first-order lights as sub beams obtained by passing a laser beam emitted from a light source through a diffraction grating.

Figure 8A:
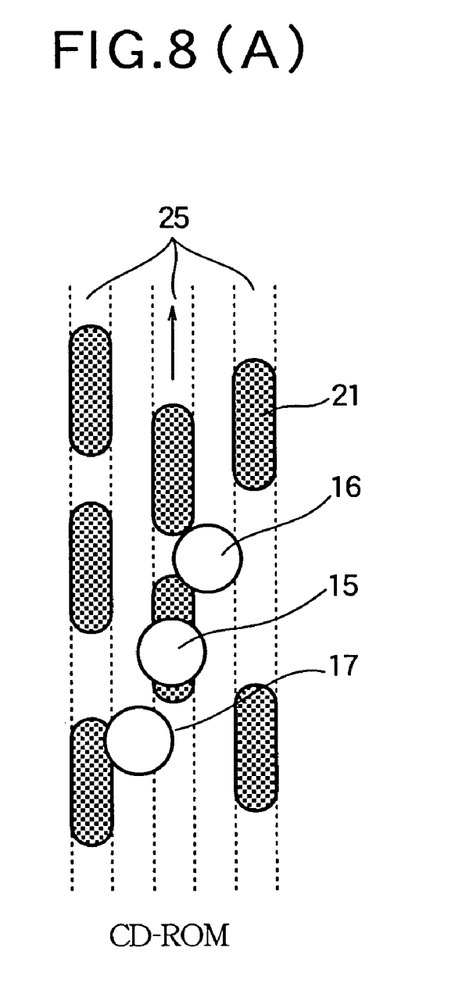
FIGS. 8(A) and 8(B) are a view showing playback and recording operations by a 3-beam method in a conventional apparatus.

FIG. 8(A) is a view schematically showing a situation where playback is carried out from a CD-ROM which is a read-only optical disk by employing the 3-beam method. In FIG. 8(A), a track 25 indicated by a broken line is a plane, and a row of pits 21 represented by hatching is actually called a track. The pit 21 is formed in a relief structure, and projected in an upper direction from a paper surface. Among three beams, a main beam 15 which is a zero-order light is mainly responsible for information reading, and follows a track 25. The light reflected back from the track receives a light reduction effect of scattering or the like by the pits 21 to thereby contribute to the information reading. Sub beams 16 and 17 which are positive and negative first-order lights are positioned before and after the main beam 15, and arranged to be offset left and right at a 1/2 track pitch. A tracking error signal is obtained from a differential signal between both outputs of the sub beams 16 and 17, and a main beam position is controlled in accordance with the tracking error signal to carry out tracking control. An arrow in the drawing indicates a traveling direction of the optical beam relative to the track 25.

Figure 8B:
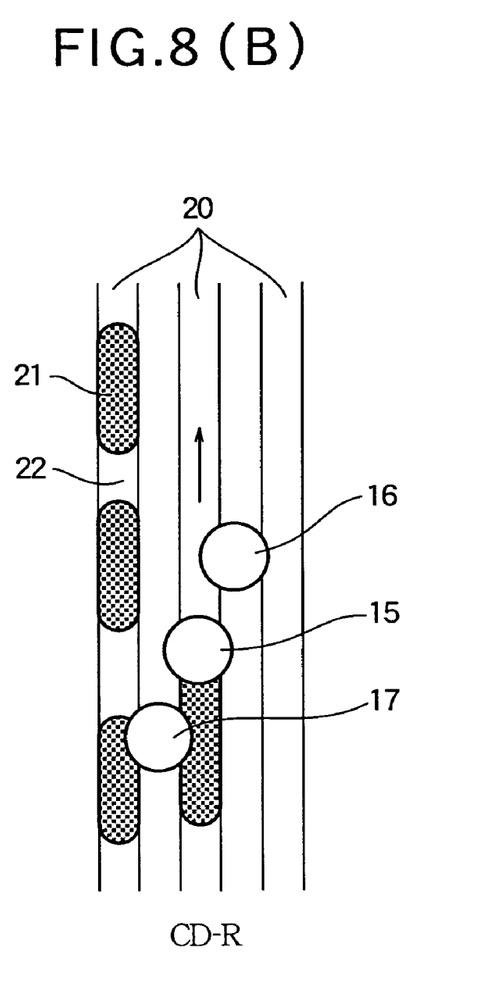

FIG. 8(B) is a view schematically showing a situation where recording is carried out in a CD-R which is a recordable optical disk by employing the 3-beam method. A guide groove 20 indicated by a solid line in FIG. 8(B) is equivalent to the track 25 of FIG. 8(A). The guide groove 20 is formed in a relief structure, and projected in an upper direction from a paper surface. During recording, among three beams, a main beam 15 which is a zero-order light is mainly responsible for information recording and follows on a track 20. In a pit portion, the laser power is increased to a recording power level to form a pit 21 and, in a blank portion 22, the laser power is controlled to a reading power level to follow the guide groove. The pit 21 formed here has a reflected light reduction effect equal to that of the relief pit 21 of FIG. 8(A). Sub beams 16 and 17 which are positive and negative first-order lights are positioned before and after the main beam 15, and arranged to be offset left and right at a 1/2 track pitch. A tracking error signal is obtained from a differential signal between both outputs of the sub beams 16 and 17, and a main beam position is controlled in accordance with the tracking error signal to carry out tracking control. An arrow in the drawing indicates a traveling direction of the optical beam relative to the track 20.

Figure 2:
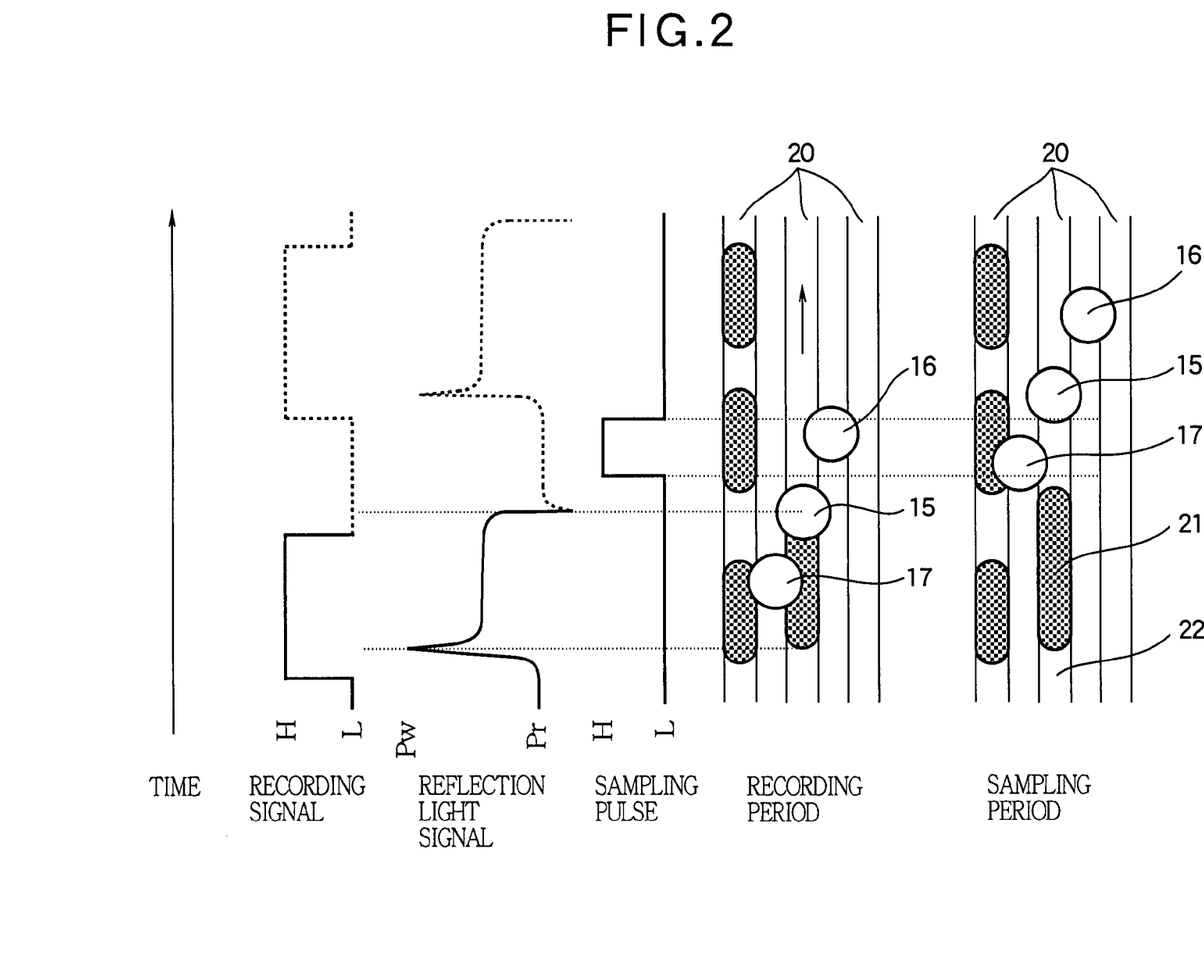
FIG. 2 is an arrangement view of three beam spots and recording pits during servo sampling to obtain a tracking error signal.

FIG. 2 schematically shows a situation of the CD-R recording apparatus during recording and tracking. With respect to a time axis, a recording signal is changed alternately to a low (L) level equivalent to a reading power level and a high (H) level equivalent to a recording power level, and the guide groove is irradiated with a laser beam modulated in accordance with the recording signal. The laser beam with which the guide groove is irradiated is reflected to reach an optical pickup again, and then converted into an electric signal by a photodetector to be outputted. An outputted signal of the reflected light becomes a fully reflected level until a pit is formed, thus exhibiting a sudden level increase. The signal is increased to Pw equivalent to the recording power level and, when pit formation is started, energy is absorbed to reduce the signal level. During the pit formation, a stable level is exhibited. When irradiation laser power becomes a reading power level in accordance with the recording signal, a reflection signal output also becomes Pr equivalent to the reading power level.

During the process from the recording signal to the reflection signal, waveform correction of the recording signal called a write strategy is carried out to set desired pit and blank lengths. The recording signal and the reflection signal are consequently deviated from each other in certain parts, but a detail is omitted.

After predetermined time from the point of time when the reflection signal becomes the reading power level Pr, a servo sampling pulse is issued, and servo sampling is carried out in a predetermined section of the reading power level Pr to generate a tracking error signal. During the pit recording by the main beam 15, among a pair of sub beams, a preceding sub beam 16 is placed on an unrecorded track, while a succeeding sub beam 17 partially overlaps the pit in which recording is currently carried out by the main beam 15. During this period, however, tracking error signal generation is not carried out. For the tracking error signal, a tracking error signal obtained in a blank section immediately before is held to control tracking. After the predetermined time from the point of time when the reflection signal becomes the reading power level Pr, the succeeding sub beam 17 is shift in a blank portion and, in this blank portion, servo sampling is carried out to generate a tracking error signal. That is, during the tracking error signal generation, since the preceding and succeeding sub beams 16 and 17 are both placed in the blank portion, no difference is generated in the amounts of reflected lights between both of the sub beams 16 and 17 while the main 15 beam follows around the guide groove 20.

Figure 3:
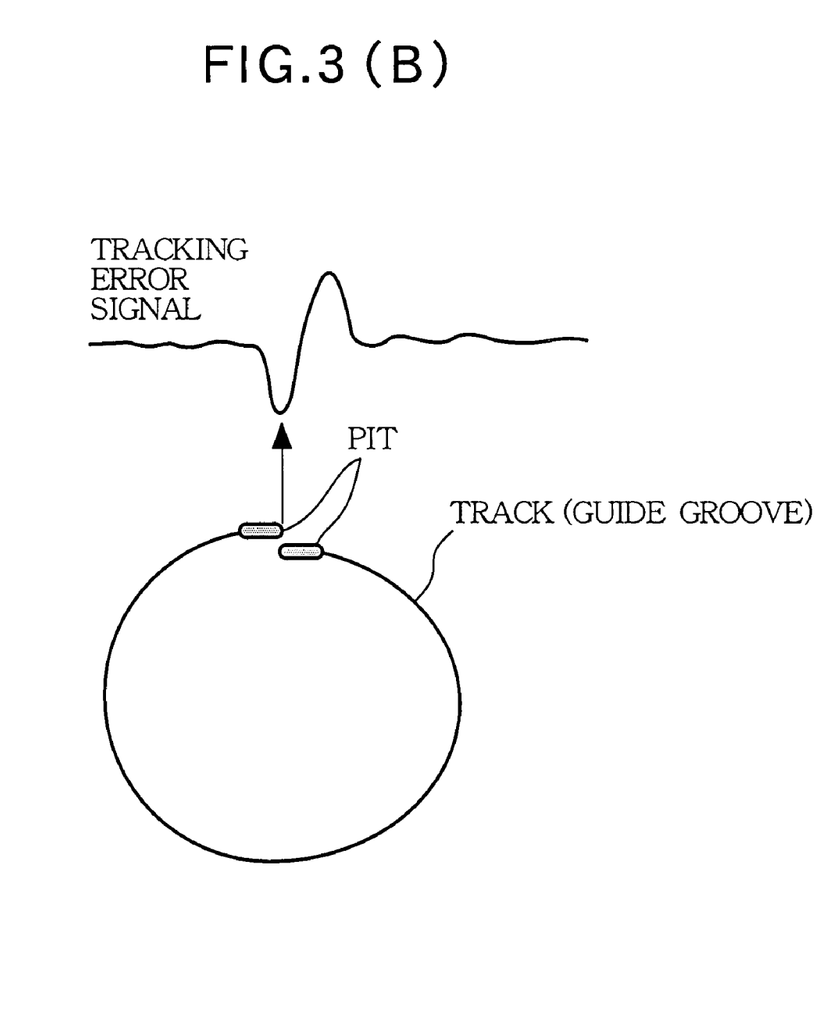
FIGS. 3(A) and 3(B) are explanatory views of tracking error oscillation.

Regarding the pit formation, however, if pits are formed deeply, densely or widely, recording is carried out by increasing laser power. Specifically, if recording is carried out under conditions such as 70% or higher of a recording signal duty, 20 mW or higher of recording laser power, and CAV control of a recording speed from an inner peripheral speed of 4 times to an outer peripheral speed of 10 times, most parts of the optical disk recording surface become pits, and overpower recording is carried out in all recorded areas. FIGS. 3(A) and 3(B) are schematic views when recording is carried out while increasing the laser power to widely and intensively form pits. FIG. 3(A) shows a state during the servo sampling, i.e., a state immediately before a succeeding sub beam 17 reaches a blank position to issue a sampling pulse. If a sampling pulse is issued, and a tracking error signal is sampled, the following problem is observed to occur. Compared with FIG. 2, the preceding sub beam 16 is in an unrecorded guide groove (i.e., blank portion), while the succeeding sub beam 17 partially overlaps the wide pit 21 in which high laser power recording has been carried out one round before to thereby reduce the amount of a reflected light of the sub beam 17. Then, an error occurs because the tracking error signal is a differential signal between both of the sub beams 16 and 17 and, by its impulse response, an undesirable track jump occurs.

FIG. 3(B) is a view schematically showing a relation between the observed tracking error signal and guide groove tracking. During the guide groove tracking, the tracking error signal is controlled nearly to a zero value to carry out stable tracking. However, the moment another round is made, the aforementioned tracking error signal is generated when the position of the pit widely formed at high laser power one round previously is reached and, by an impulse response to a noise signal, an undesirable track jump is caused. Depending on a magnitude of the response, only slight oscillation occurs. However, this oscillation occurs during subsequent rounds and, by this undesirable tracking error signal, a tracking servo becomes unstable.

SUMMARY OF THE INVENTION

In order to solve the foregoing problems, the present invention provides the following constitution.

Namely, the inventive optical recording apparatus comprises a rotating section that is provided for rotating an optical disk which is formed thereon with a guide groove to define a spiral track having a plurality of rounds, an optical pickup that has a light source for generating an optical beam and a diffractive grating for diffracting the optical beam to form a main beam and a pair of sub beams opposite with each other relative to the main beam, the optical pickup being operable for irradiating the main beam to the spiral track with accompanying the pair of the sub beams along apposite sides of the spiral track, a servo section that operates the optical pickup to enable the main beam to trace the spiral track based on a tracking error signal derived from return lights of the sub beams reflected back from the optical disk, a recording section that modulates the main beam for recording of information onto the spiral track while the optical dick is rotated, and a control section that controls recording of information each cycle the optical disk is rotated such that the recording of information is enabled to fill one round of the spiral track and disabled to blank another round of the spiral track so as to alternate the filled rounds and the blanked rounds.

Preferably, the control section operates when the recording of information to a current round of the spiral track is finished for controlling the servo section to jump the main beam from an end of the current round to an end of a next round of the spiral track so as to blank the next round. Otherwise, the control section operates when the recording of information to a current round of the spiral track is finished for controlling the recording section to disable the main beam for one cycle of the rotation until the main beam reaches an end of a next round of the spiral track so as to blank the next round. Expediently, the control section controls the servo section and the recording section for performing a session of recording information by alternating the filled rounds and the blanked rounds, and performing an additional session of recording information selectively into the blanked rounds of the spiral track while skipping the filled rounds of the spiral track. Practically, the recording section modulates an intensity of the optical beam according to information representative of an image for forming pits and lands along the spiral track to thereby draw the image on the optical disk.

According to the invention, by carrying out a track jump in accordance with a track jump signal from the control section for each round recording, it is possible to prevent instability of the tracking servo by an undesirable tracking error signal caused by the reflected light amount difference between the pair of the sub beams.

DETAILED DESCRIPTION OF THE INVENTION

Figure 1:
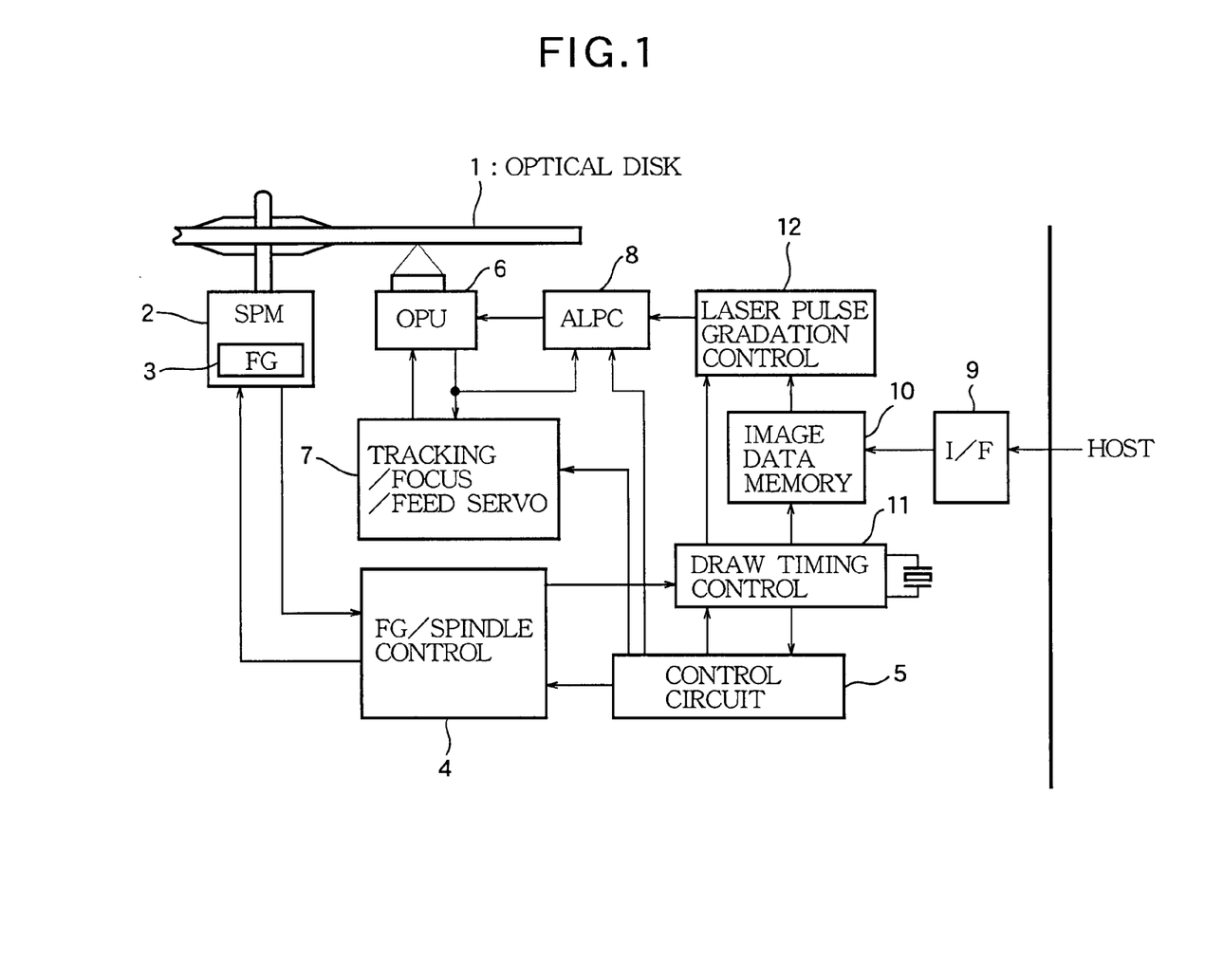
FIG. 1 is a block diagram showing a system configuration of the present invention.

The mode for carrying out the present invention will be described. Here, description will be made of an optical disk recording apparatus which uses a CD-R recording medium to form an image on a recording surface in accordance with areas, sizes or a crude density of pits. FIG. 1 is a constitutional view of the invention. An optical disk 1 is tightly held by a clamper and a turntable, and rotated by a spindle motor 2. The spindle motor 2 is equipped with a frequency generator (FG, hereinafter) 3. The FG 3 comprises a hall element arranged radially around a rotary shaft of the spindle motor 2, and generates a predetermined number of pulse signals during one rotation cycle of the rotary shaft. The pulse signals outputted from the FG 3 are used as rotational speed signals. FG/spindle motor control section (rotation control section, hereinafter) 4 receives each rotational speed signal, inspects a rotational speed, and returns a control signal to the spindle motor 2 so as to set a desired rotational speed. The optical disk 1 is disposed so that its recording surface can face an optical pickup 6. The optical pickup 6 incorporates a predetermined optical system and a predetermined driving system (not shown), and is attached to the outside. The optical pickup 6 irradiates a guide groove beforehand formed in the optical disk with three optical beams of a zero-order light and positive and negative first-order lights obtained by passing an optical beam emitted from an incorporated light source through a diffraction grating, and records information while carrying out tracking control by using a tracking error signal so that the zero-order light can trace the guide groove by using the positive and negative first-order lights among the three optical beams. During this period, a low-pass component signal of the tracking error signal is used to carry out feed control for transferring the optical pickup 6 in a radial direction of the optical disk 1, and a focus error signal is used to carry out focus control. A laser beam emitted from the optical pickup 6 to the optical disk 1 receives intensity modulation such as energy absorption when the laser beam is reflected on the recording surface, and reaches the optical pickup 6 again. The arrived reflected light is converted into an electric signal by a photodetector and outputted to tracking/focus/feed servo section (servo section, hereinafter) 7. The servo section 7 uses a predetermined photodetector output to generate a servo control signal, and returns the signal to the optical pickup 6 to carry out loop control. For example, a differential signal is obtained between output signals of the photodetector receiving both of the reflected sub beam lights to generate a tracking error signal, and to form a tracking servo loop. A reflection signal is also outputted to automatic laser power control section (ALPC, hereinafter) 8. The ALPC 8 compares a reflection signal level with a predetermined level to carry out control so that laser power can become an optimal level.

Recording information transferred from a host computer to form a visible image is received through an interface (I/F, hereinafter) 9 and temporarily saved in an image data memory 10. The recording information contains a code which indicates an image gradation. Based on recording signal information read from the image memory 10, recording waveform correction formation is carried out by laser pulse gradation control section 12 so as to set desired gradation. For example, the recording signal is turned into multiple pulses, and its duty is changed by a gradation code to make a thick or thin adjustment. Alternatively, a power level is changed by a gradation code to make a density adjustment. Otherwise, starting and trailing ends of the recording signal are changed by a gradation code to make a crude density adjustment. Needless to say, these may be combined to make a total adjustment. A corrected recording signal generated by the laser pulse gradation control section 12 is outputted to the ALPC to become a desired laser power pulse, and emitted to the optical disk 1 to form an image.

Here, the example of generating the recording signal by the laser pulse gradation control section 12 based on the gradation information contained in the recording information has been described. However, for example, a constitution may be employed where a basic recording signal of a duty 80% and the gradation information are received from the host computer, and the basic recording signal is subjected to waveform correction by the laser pulse gradation control section 12 to form a recording signal. Namely, the recording section may receive information, then generating a recording waveform according to the received information, and modulating an intensity of the main beam based on the recording waveform so as to record the information onto the spiral track. Otherwise, the recording section may receive a signal representative of the information, then adjusting a recording waveform according to the received signal, and modulating an intensity of the main beam based on the adjusted recording waveform so as to record the information.

The present invention further comprises draw timing control section 11. The draw timing control section 11 comprises clock generation section. This clock signal is used to count pulses of a rotational speed signal outputted from the rotation control section 4. When a predetermined number of pulses is reached during one rotation of the rotary shaft of the spindle motor 2, a timing signal is outputted to the image data memory 10, the laser pulse gradation control section 12 and control section 5 for resetting. The image data memory 10 receives the timing signal, and outputs recording signal information of one round from a predetermined memory address. The laser pulse gradation control section 12 receives the timing signal, and reads the recording signal information of one round from the image data memory 10 to start recording signal waveform correction formation. The control section 5 sends a track jump signal to servo section 7, and a laser power setting signal to the ALPC 8.

Figure 4:
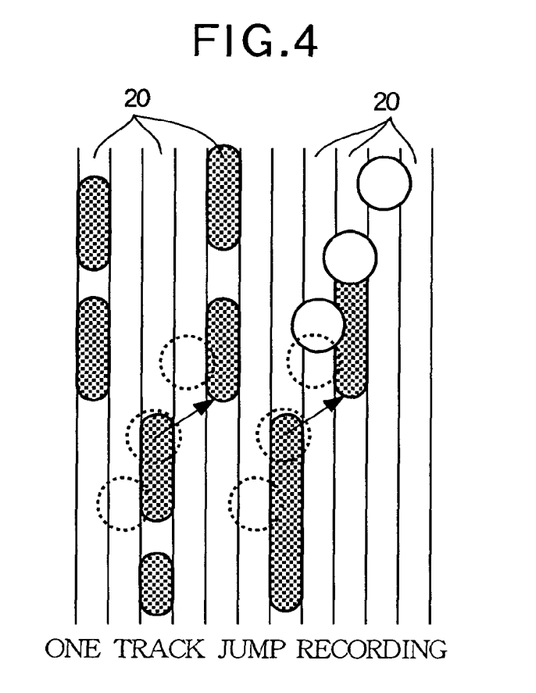
FIG. 4 is a view showing an alternating round recording operation carried out by using one track jump according to an embodiment of the present invention.

FIG. 4 shows an embodiment of the present invention. According to the embodiment, upon a start of recording from a predetermined position, the control section 5 resets the draw timing control section 11. When recording is continued by one round, a timing signal is generated from the draw timing control section 11, and the control section 5 which receives the timing signal sends one track jump signal to the servo section 7. The optical pickup 6 which receives the one track jump signal jumps the main beam to a track one round outside to continue recording. Thereafter, the same operation is carried out for each one rotation. The operation under control of the control section 5 never causes instability of the servo section 7.

Figure 5:
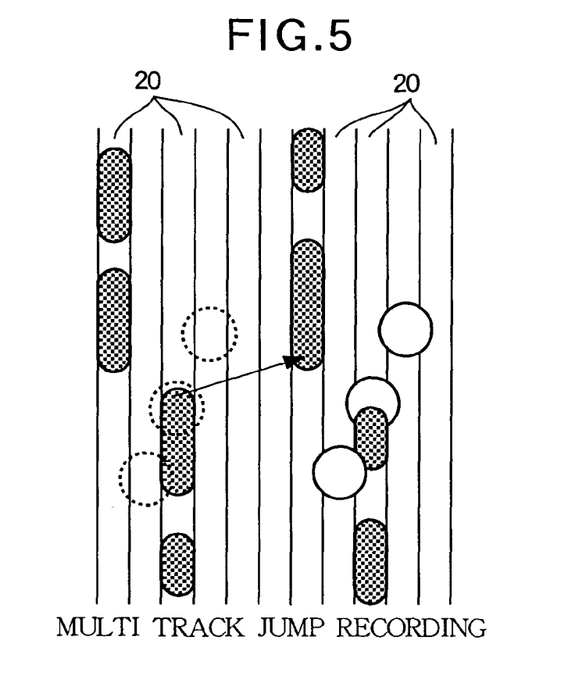
FIG. 5 is a view showing another alternating round recording operation carried out by using a plurality of track jumps according to another embodiment of the present invention.

FIG. 5 shows another embodiment of the present invention. According to the embodiment, the number of track jumps is two or more. Generally, the control section 5 controls recording of information each cycle the optical disk is rotated such that the recording of information is enabled to fill one round of the spiral track 20 and disabled to blank another round of the spiral track 20 so as to alternate the filled rounds and the blanked rounds. Typically, the control section 5 operates when the recording of information to a current round of the spiral track 20 is finished for controlling the servo section 7 to jump the main beam from an end of the current round to an end of a next round of the spiral track 20 so as to blank the next round.

Figure 6:
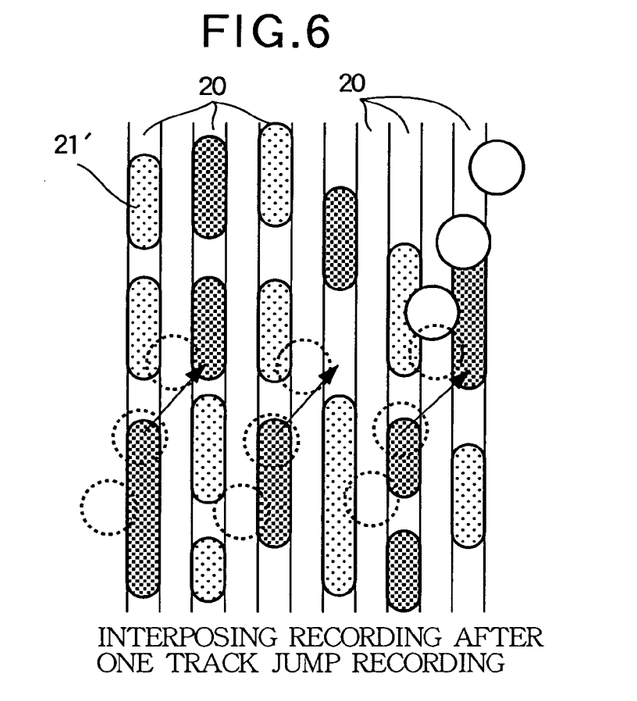
FIG. 6 is a view showing an interposing round recording operation carried out after alternating round recording according to an embodiment of the present invention.

FIG. 6 shows yet another embodiment of the present invention. According to the embodiment, after the above described alternating round recording which uses one track jump, recording is carried out again from an original position at an unrecorded round between the recorded rounds. In the recording mode of FIG. 4 which is an origin, for a recording start position, an address position specified by the control section 5 is searched, and recording is started from a position which address is found. Thus, also according to this embodiment, a start specified address is searched, and the draw timing control section 11 is reset in a found position. Then, the main beam follows the guide groove at a reading power level for one round, then carries out one track jump upon reception of a timing signal, and sets laser power to a recording power level. Thereafter, similarly, interposing round recording is carried out by using one track jump. Namely, the control section controls the servo section 5 and the recording section 7 for performing an interleaving session of recording information by alternating the filled rounds and the blanked rounds, and performing an interposing session of recording information 21' selectively into the blanked rounds of the spiral track 20 while skipping the filled rounds of the spiral track 20.

Figure 7:
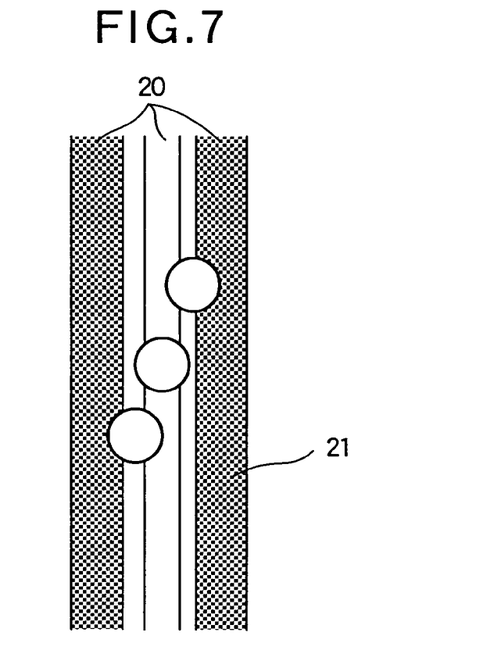
FIG. 7 is a view showing a tracking signal stable state during alternating round recording according to an embodiment of the present invention.

Here, in the case of carrying out the interposing round recording, there is a danger that an undesirable track jump pulse may be generated if the succeeding sub beam partially overlaps the previous round record pit. However, as can be understood from FIG. 7, a black pit length becomes very long in image formation. In this case, since not only a part of the record pit overlaps the succeeding sub beam but also a part of the previous record pit overlaps the preceding sub beam, output of both of the sub beams become nearly similar to prevent undesirable oscillation of the tracking signal.

MODIFIED EXAMPLE 1

As an embodiment to which the present invention can be applied, not one track jump but one round tracking where the laser power is set to a reading level can be used. Tracking tolerance in reading needs not be stricter than that in recording and, even when slight deviation occurs, it can be solved by returning. Additionally, an impulse response can be prevented by reducing a servo gain during a reading level round. That is, the control section 5 sends not a track jump signal but a servo gain control signal to the servo section in accordance with a timing signal, whereby the prevention can be achieved. Needless to say, simultaneously, the ALPC 8 sends a laser power control signal to make a laser power adjustment. Namely, the control section 5 operates when the recording of information to a current round of the spiral track is finished for controlling the recording section to disable the main beam for one cycle of the rotation until the main beam reaches an end of a next round of the spiral track so as to blank the next round.

MODIFIED EXAMPLE 2

As an embodiment to which the present invention can be applied, it can be applied to normal data recording. Data memory section is disposed in place of the image data memory section 10 of FIG. 1, and an eight-to-fourteen modulation (EFM) encoder and write strategy section are disposed in place of the laser pulse gradation control section 12. A recording signal transferred from a host computer is temporarily stored in the data memory section, and subjected to EFM encoding. When the EFM signal subjected to the EFM encoding is further subjected to waveform correction by the write strategy section, and laser emission recording is carried out by an ALPC 8, interleaving round recording and interposing round recording can be carried out similarly.

MODIFIED EXAMPLE 3

The optical disk recording apparatus of the present invention which uses the CD-R recording medium to form an image on the recording surface based on areas, sizes or a crude density of pits has been described with reference to the case where the pits are formed deeply, densely or widely by the high laser power. A similar phenomenon occurs when recording is carried out on an optical disk manufactured by narrow track pitches. That is, the phenomenon occurs when recording is carried out on the optical disk which enables recording/playback by using the same optical system but which is manufactured by narrow track pitches to increase a recording capacity. Thus, also when recording is carried out on the narrow track pitch optical disk, it is possible to carry out interleaving round recording and interposing round recording similarly.

In the optical disk recording apparatus which employs the 3-beam method, when a reflected light difference between sub beams is generated because of the pits formed large by the high laser power recording, oscillation of the tracking error signal may be caused. According to the invention, such an oscillation can be prevented by carrying out alternating round recording which uses one track jump.

What is claimed is:

1. An optical recording apparatus comprising:
    a rotating section that is provided for rotating an optical disk which has formed thereon a guide groove to define a spiral track having a plurality of rounds;
    an optical pickup that has a light source for generating an optical beam and a diffractive grating for diffracting the optical beam to form a main beam and a pair of sub beams opposite with each other relative to the main beam;
    a servo section that operates the optical pickup to enable the main beam to trace the spiral track with the accompanying pair of the sub beams along opposite sides of the spiral track based on a tracking error signal derived from return lights of the sub beams reflected back from the optical disk;
    a recording section that modulates the main beam for recording of information onto the spiral track while the optical disk is rotated and the power of main beam is increased to widely form pits to the extent that the pits recorded on previous round overlap partially with the sub beam positioned on the radially inner side so as to cause an undesirable track jumping; and
    a control section that controls recording of information each cycle the optical disk is rotated such that the recording of information is enabled to record one round of the spiral track and enabled to blank another round of the spiral track so as to alternate recorded rounds and blanked rounds.

2. The optical recording apparatus according to claim 1, wherein the control section operates when the recording of information to a current round of the spiral track is finished for controlling the servo section to jump the main beam from an end of the current round to an end of a next round of the spiral track so as to blank the next round.

3. The optical recording apparatus according to claim 1, wherein the control section operates when the recording of information to a current round of the spiral track is finished for controlling the recording section to disable the main beam to record for one cycle of the rotation until the main beam reaches an end of a next round of the spiral track so as to blank the next round.

4. The optical recording apparatus according to claim 1, wherein the control section controls the servo section and the recording section for performing a session of recording information by alternating the recorded rounds and the blanked rounds, and performing an additional session of recording information selectively into the blanked rounds of the spiral track while skipping the rounds of the spiral track recorded in the previous session.

5. The optical recording apparatus according to claim 1, wherein the recording section modulates an intensity of the optical beam according to information that represents an image for forming pits and lands along the spiral track to thereby draw the image on the optical disk.

6. An optical recording apparatus for recording information on an optical disk, comprising:
    a rotating section that is provided for rotating the optical disk which has formed thereon a guide groove to define a spiral track having a plurality of rounds;
    a detecting section that is provided for detecting a rotation signal that represents a rotation speed of the rotating section;
    a regulating section that is provided for regulating the rotating section in response to the rotation signal;
    an optical pickup that has a light source for generating an optical beam and a diffractive grating for diffracting the optical beam to form a main beam and a pair of sub beams opposite with each other relative to the main beam;

a servo section that operates the optical pickup to enable the main beam to trace the spiral track with the accompanying pair of the sub beams along opposite sides of the spiral track based on a tracking error signal derived from return lights of the sub beams reflected back from the optical disk;

a recording section that is provided for receiving information, then generating a recording waveform according to the received information, increasing the power of main beam to widely form pits to the extent that the pits recorded on previous round overlap partially with the sub beam positioned on the radially inner side so as to cause an undesirable track jumping and modulating an intensity of the main beam based on the recording waveform so as to record the information onto the spiral track;

a timing section that is provided, receptive of the rotation signal, for outputting a timing signal that indicates an end of a round; and a control section that is provided, responsive to the timing signal, for controlling either of the servo section or the recording section so as to alternate a recorded round recorded with the information and a blank round not recorded with the information by jumping the main beam by one round each time the timing signal is outputted or by suppressing the power of the optical beam every one round after recorded round.

7. An optical recording apparatus for recording information on an optical disk, comprising:

a rotating section that is provided for rotating the optical disk which has formed thereon a guide groove to define a spiral track having a plurality of rounds;

a detecting section that is provided for detecting a rotation signal that represents a rotation speed of the rotating section;

a regulating section that is provided for regulating the rotating section in response to the rotation signal;

an optical pickup that has a light source for generating an optical beam and a diffractive grating for diffracting the optical beam to form a main beam and a pair of sub beams opposite with each other relative to the main beam;

a servo section that operates the optical pickup to enable the main beam to trace the spiral track with the accompanying pair of the sub beam along opposite sides of the spiral track based on a tracking error signal derived from return lights of the sub beams reflected back from the optical disk;

a recording section that is provided for receiving a signal that represents the information, then adjusting a recording waveform according to the received signal, increasing the power of main body to widely form pits to the extent that the pits recorded on previous round overlap with the sub beam positioned on the radially inner side so as to cause an undesirable track jumping, and modulating an intensity of the main beam based on the adjusted recording waveform so as to record the information;

a timing section that is provided, receptive of the rotation signal, for outputting a timing signal that indicates an end of a round; and a control section that is provided, responsive to the timing signal, for controlling either of the servo section or the recording section so as to alternate a recorded round recorded with the information and a blank round not recorded with the information by jumping the main beam by one round each time the timing signal is outputted or by suppressing the power of the optical beam every one after recorded round.

8. A method of recording information on an optical disk by section of an optical pickup having a light source generating an optical beam and a diffractive grating for diffracting the optical beam to form a main beam and a pair of sub beams opposite with each other relative to the main beam, the method comprising the steps of:

rotating the optical disk which has formed thereon a guide groove to define a spiral track having a plurality of rounds;

operating the optical pickup for irradiating the main beam to the spiral track with the accompanying pair of the sub beams along opposite sides of the spiral track;

further operating the optical pickup to enable the main beam to trace the spiral track based on a tracking error signal derived from return lights of the sub beams reflected back from the optical disk;

modulating the main beam for recording of the information onto the spiral track while the optical disk is rotated and the power of main beam is increased to widely form pits to the extent that the pits recorded on previous round overlap partially with the sub beam positioned on the radially inner side so as to cause an undesirable track jumping; and controlling the recording of the information each cycle the optical disk is rotated such that the recording of the information is enabled to record one round of the spiral track and enabled to blank another round of the spiral track so as to alternate recorded rounds and blanked rounds.

* * * * *